B. C. STICKNEY.
COMBINED TYPE WRITING AND COMPUTING MACHINE.
APPLICATION FILED NOV. 7, 1911.
1,183,602.
Patented May 16, 1916.
5 SHEETS—SHEET 1.
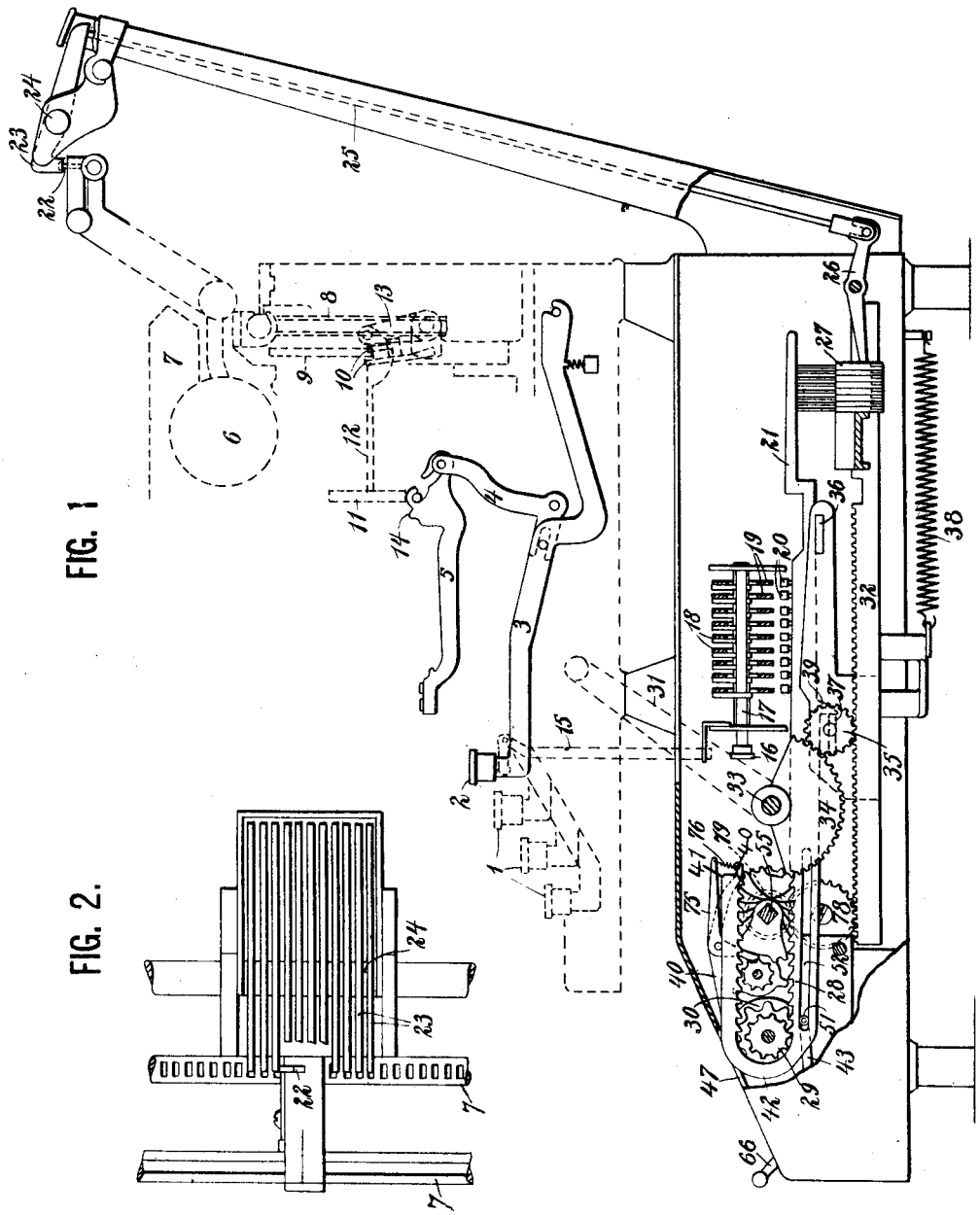
Witnesses
F. C. Alexander
Titus N. Irons
Inventor
Burnham C. Stickney

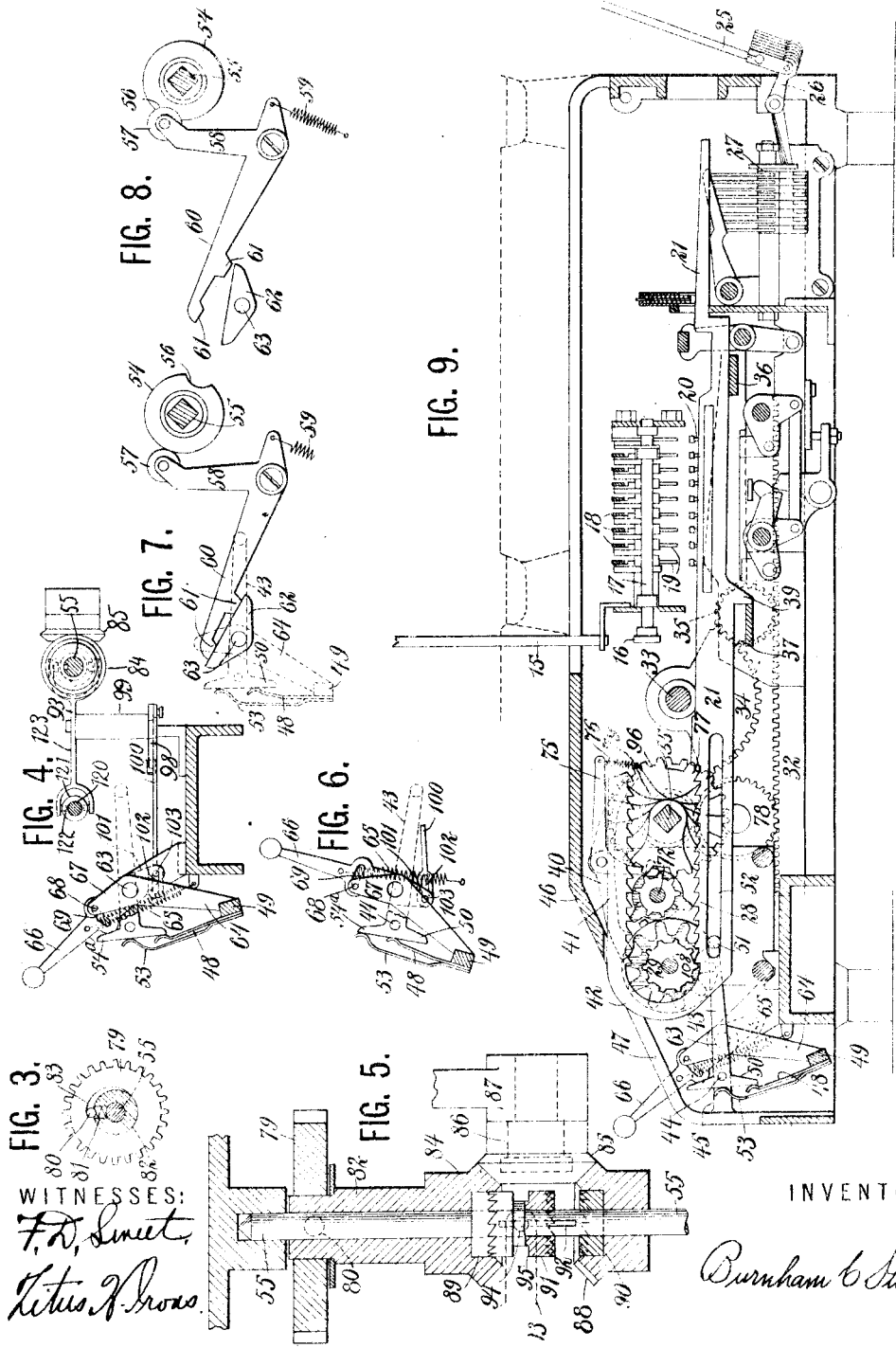

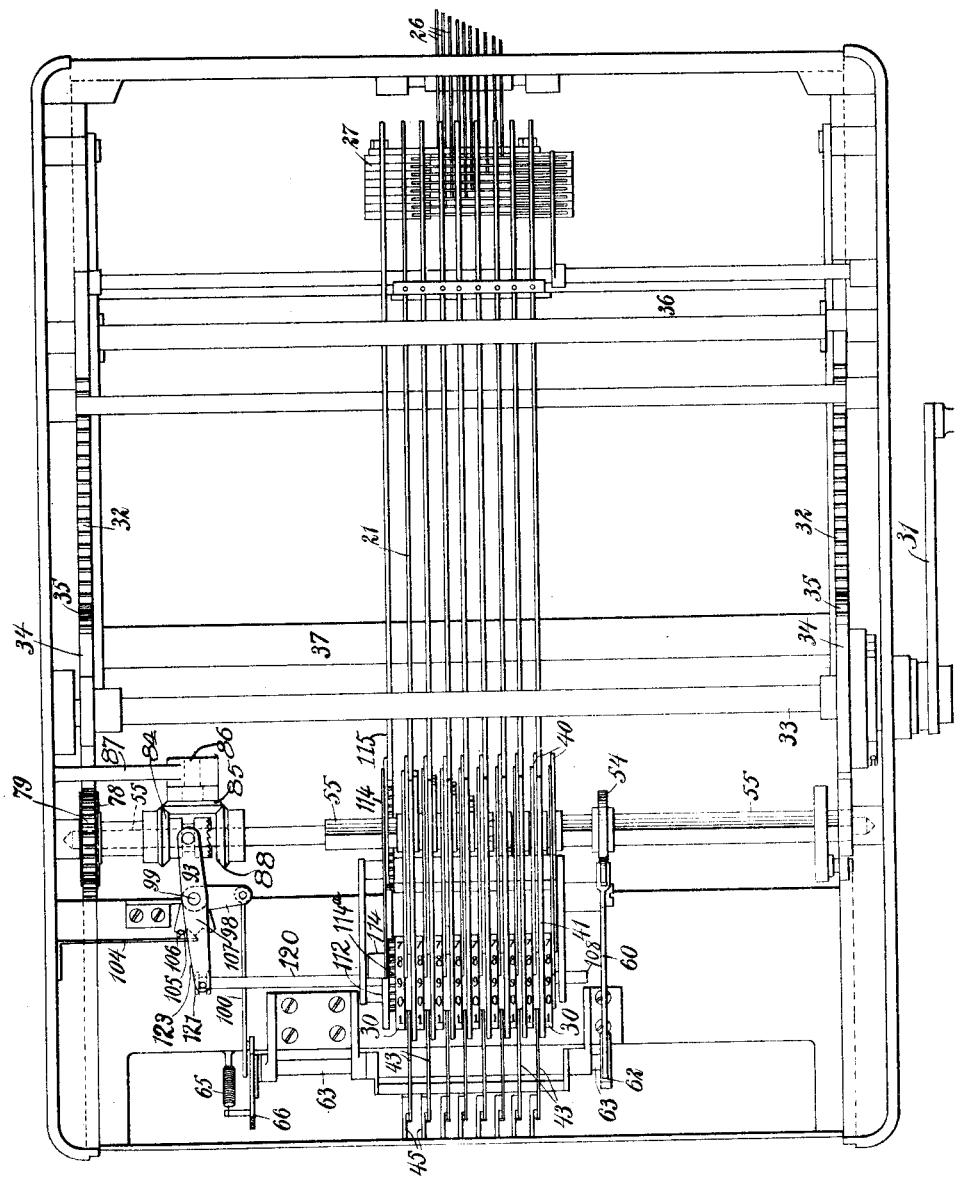

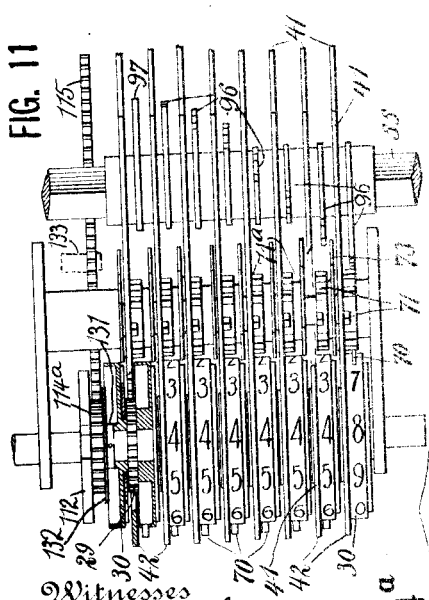

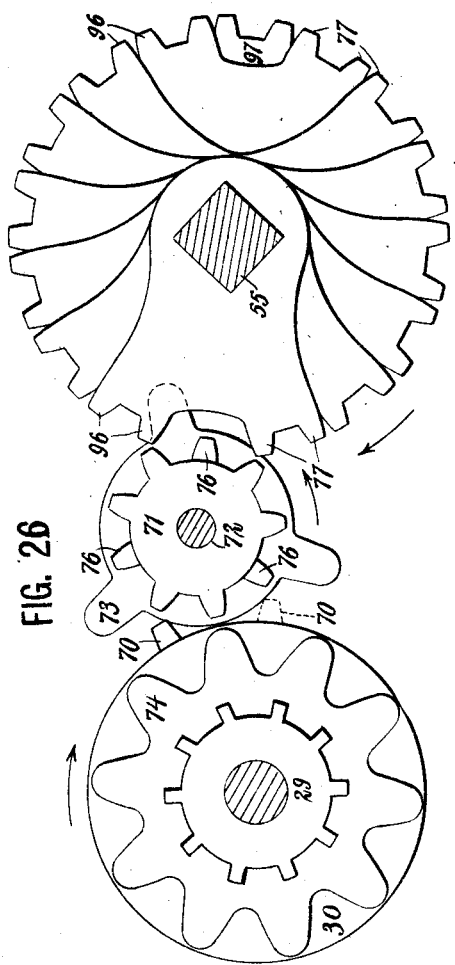
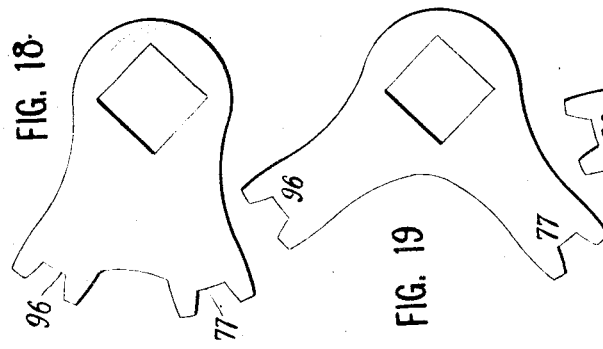
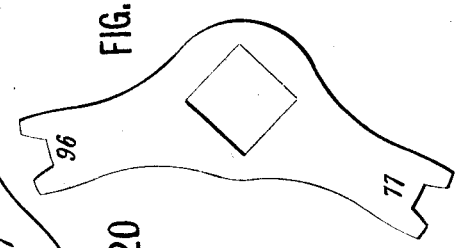

UNITED STATES PATENT OFFICE.

BURNHAM C. STICKNEY, OF ELIZABETH, NEW JERSEY, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,183,602.　　　Specification of Letters Patent.　　Patented May 16, 1916.

Application filed November 7, 1911. Serial No. 658,958.

*To all whom it may concern:*

Be it known that I, BURNHAM C. STICKNEY, a citizen of the United States, residing in Elizabeth, in the county of Union and State of New Jersey, have invented certain new and useful Improvements in Combined Type-Writing and Computing Machines, of which the following is a specification.

This invention relates to computing machines, in which after certain pins or devices are set up by means of keys, a general operator or means is called into action to rotate the computing wheels or equivalent devices, to various extents, depending upon the pins so set. A machine of this class is illustrated in the United States patent to Hanson No. 905,421, dated Dec. 1, 1908, and also in the pending application of Frederick A. Hart, No. 466,836, filed December 10, 1908. The invention, however, is applicable to other types also.

The principal object of the invention is to provide simplified, improved and inexpensive means for performing subtraction.

In machines illustrated in said patent and application, the dial wheels have starting pins, which start certain tens-carrying trains; and at the subsequent operation of the general operator not only are the dial wheels rotated as aforesaid, but the tens-carrying trains are also completely actuated, carrying tens to the higher denominations. The tens-carrying mechanism includes a power-driven driver connected to the general operator to be intermittently revolved, and upon said driver are placed segments which move into engagement with the tens-carrying trains and effect or complete the rotations thereof; said segments being placed spirally upon said driver, so that the operation of one tens-carrying train is completed before that of the next train is effected by the common driver. In said application and patent, the dial wheels are rotated always in one direction; the same is true of the tens-carrying trains and also of the common driver for said trains.

According to the present improvements, the direction of rotation of the dial wheels or other computing devices may be reversed for effecting subtraction; and the starting pins on these dial wheels may start the tens-carrying trains in reverse direction, and the common driver for the tens-carrying trains may also be reversed to borrow tens.

In one form of the invention, the bars which carry the key-set pins are provided at their forward ends with lower and upper racks to engage either the lower or upper sides of the pinions, which are connected to the dial wheels, so that at the forward motions of said bars, effected by the general operator, in the usual manner, the pinions and wheels may be revolved either backwardly or forwardly, to effect either addition or subtraction.

A shiftable device is provided for bringing into use either the lower racks or the upper racks; and there is also provided a back-gearing for reversing the direction of rotation of the common driver of the tens-carrying trains when required. Upon said common driver there are placed not only the usual set of spirally arranged sectors or teeth for driving the tens-carrying trains, but also another set of sectors or teeth, these last being also spirally arranged, but in the reverse direction. The common driver normally stands in such position that if it turns in one direction, one set of segments is brought into use for turning the tens-carrying trains in the direction to add; while if said driver is rotated in the opposite direction, the other set of segments is brought into use, therefore causing the tens-carrying trains to subtract or borrow; it being understood that upon the completion of the operation of either set of segments, the remaining set will revolve idly past all the tens-carrying trains, since when any segment moves its train, it leaves the same clear, so that it cannot be engaged by the companion segment; each tens carrying train having a mutilated pinion, whereby such clearance may be effected.

Other objects and advantages will hereinafter appear.

Figure 1 is a part sectional side elevation of a combined typewriting and computing machine, of the Underwood-Hanson type, showing the present improvements applied thereto. Fig. 2 is a plan of a portion of the dog and jack mechanism, whereby the carriage of the typewriter controls or selects the denomination of the computing wheel which is to be actuated or controlled. Fig. 3 is a sectional elevation of a clutch between the common driver of the tens-carrying mechanism and the pinion, whereby said driver is revolved; said clutch permitting said pinion to be revolved idly by the general operator during the forward stroke of the latter, but causing it to rotate during the return stroke of the general operator. Fig. 4 is a sectional side elevation of a shiftable lever or handle, and means connected thereto for setting the machine for either addition or subtraction, the parts being shown in addition positions. Fig. 5 is a sectional plan of the back-gearing or clutch-mechanism, for altering the direction of rotation of the tens-carrying driver. Fig. 6 shows the Fig. 4 handle shifted back to set the machine for subtraction. Fig. 7 is a diagram to illustrate the shifting of the dial driving racks to neutral positions during the return stroke of the general operator. Fig. 8 shows the normal positions of the parts at Fig. 7, when the machine is set for adding. Fig. 9 is a longitudinal sectional view through the computing mechanism, the machine being set for adding. Fig. 10 is a plan of the computing devices. Fig. 11 is a plan of the computing head and the tens-carrying trains. Fig. 12 illustrates the manner in which a segment clears the mutilated pinion of the tens-carrying train, so that it will not be affected by subsequent revolution of the same segment, unless in the meantime said pinion is started by a starting tooth on the dial wheel. Fig. 13 is a similar view, illustrating the subtraction operation, the parts at such operation turning in the directions shown by the arrows. Fig. 14 is a perspective view of an arbor on which the computing wheels are mounted, and by which they are advanced to zero positions. Fig. 14ᵃ is a perspective showing the sight opening and the rack slots in the casing. Fig. 15 is a sectional view showing the same arbor, shown in Fig. 14 with means for driving and locking the same. Fig. 16 is a diagram illustrating the relation between the computing wheel pinion and its double rack; the parts being set for addition. Fig. 17 is a sectional view of the parts seen at Fig. 16. Figs. 18 to 25 inclusive are detail views, on a large scale, of the adding and subtracting segments. Fig. 26 illustrates the relation between the computing wheels, the tens-carrying trains, and the segments for causing the latter to add and subtract; this view showing the assemblage of the segments from Figs. 18 to 25.

In said machine, alphabet keys 1 and numeral keys 2 depress levers 3 to operate bell cranks 4, to swing type bars 5 up to strike against the front of a platen 6, which is mounted on a carriage 7, propelled by a spring barrel 8 and controlled by an escapement wheel 9 and dogs 10, the latter operated by a universal bar 11 mounted on a reciprocating frame 12, which is carried at its rear end by idle links 13; said universal bar being operated by heels 14 on the type bars. Said keys have stems 15 to depress arms 16 on rock shafts 17, which form parts of linkages 18; said linkages also including horizontal bars 19, which extend horizontally across the machine to enable the keys to depress any of a nest of computation pins 20. Said pins 20 are carried upon bars 21, which operate the dial wheels; there being one bar 21 for each denomination.

The carriage of the typewriter selects or determines the denomination in which computing is to be done upon the depression of any numeral key. For this purpose, the carriage carries a dog 22 to engage and cam up or lift any of a series of jacks 23, which are pivoted at 24, and at their rear ends depress rods 25, the latter connected by levers 26 to linkages 27 which lift the rear ends of the bars 21; each jack 23 being connected with its own bar 21, so that the position of the carriage 7 determines which one of said bars 21 shall lie in elevated position at the depression of any numeral key 2. At their forward ends, the bars 21 have racks 28 to engage pinions 29, which are fixed to their respective dial wheels 30, Figs. 9, 16 and 17.

The actuation of the rack-bars 21 is the same as heretofore; the general operator being driven by a crank 31 or otherwise, and comprising a pair of racks 32, to which a shaft 33 of said crank is connected by segments 34 fixed on said shaft, and idle pinions 35 intervening between said segments and said racks 32. The racks are connected by back and front horizontal cross bars 36, 37. The bar 36, as usual, engages any of the pins 20 which have been depressed by the keys; and accordingly the racks are driven forward and the computing wheels rotated. The return movement of the general operator may be caused or assisted by a spring 38, Fig. 1; and the cross bar 37 of the general operator may engage lugs 39 pendent from the bars 21, to drive the latter backward to normal positions; all the dial wheels remaining motionless while this is done, being held by spring detents 40. Also carried upon the forward end of each bar 21 is a rack 41 to be used for subtraction; this rack being parallel with the rack 28 and overlying the pinion 29, but adapted to drop into engagement with said pinion when the rack 28 drops out of engagement, so as to turn the pinion in reverse direction at the forward stroke of the bar 21 effected by the forward stroke of the general operator bar 36. The racks may be connected in any suitable way, as for instance by means of a yoke 42, which may be integral with the racks.

Each addition rack 28 is held up at Figs. 1 and 9, by means of an individual yielding arm 43. These arms are pivoted at their forward ends at 44 to ears 45, projecting inwardly from the framework; the ears and lugs being placed between the racks; and the casing 46 having longitudinal slots 47 to accommodate the forward movements of the yokes and racks. The arms 43 are held up by spring fingers 48 projecting upwardly from a transverse horizontal bar 49; each of said fingers bearing on the lower end 50 of a cross piece formed on the adjacent arm 43 near its pivot. At the rear end of each arm 43 is a wrist 51 working in a horizontal slot 52 extending rearwardly of the adjacent bar 21. It will thus be seen that the spring fingers 48 hold the racks 28 up in mesh with the pinions 29, to enable the racks to advance the pinions for addition.

The bar 49 is shiftable from the Fig. 9 position to the Fig. 6 position, to neutralize the effect of the springs 48 thereon by bringing the same to dead-center position, and also to shift springs 53 from the dead-center positions at Fig. 9 to the upper ends 54ª of the cross pieces on the arms 43, to swing said arms down and carry the lower racks 28 out of engagement with the pinions 29, and the upper racks 41 into engagement therewith so that the direction of rotation of the pinions 29 is reversed at the forward strokes of the bars 21.

During the return strokes of the rack bars, the racks 28 or the racks 41 may slip idly over the teeth of the pinion 29, said racks having beveled or ratchet shaped teeth, to permit such slipping movement; but preferably both racks are automatically disengaged during the return movements of the bars 21, to facilitate their movements, and minimize the noise. For this purpose, an automatic shifter in the form of a disk 54 is fixed upon a square shaft 55, which is given a full revolution during the return stroke of the general operator 32, in a manner presently to be explained. In said disk is a notch 56, which is normally occupied by a roll or rider 57, Fig. 8, upon the end of an arm 58, the roll being pressed in the notch by a spring 59. In the Fig. 8 position, the parts are idle; but when the shaft 55 is revolved, the roll 57 is forced out of the notch 56, and the arm 58 is vibrated, and an arm 60 is depressed, and by means of projections 61 upon its end swings a cross piece 62 provided upon a rock shaft 63, which has pendent arms 64, Figs. 4, 7 and 9, to the lower ends of which is secured the spring-carrying bar 49; and said shaft 63 is hence turned to bring the springs 48, 53 to pressure equalizing positions upon all the cross pieces 50, as seen at Fig. 7, so that the arms 43 are all brought to horizontal midway positions, thus disengaging all the racks from the pinions 29. Upon the completion of the rotation of the disk 54, the spring 59 releases the shaft 63 from the control of the arm 60, and said shaft is caused to resume its initial position by means of a spring 65, Fig. 4 or Fig. 6, with either the racks 41 or the racks 28 in mesh with the pinions 29.

This spring 65 is connected to a shifting handle or lever 66, which may extend forwardly and upwardly through the casing of the machine, for setting the machine to either add or subtract; the addition position of said lever being seen at Figs. 4 and 9, and the subtraction position thereof at Fig. 6. The spring 65 is double acting to hold the lever in either Fig. 4 position or Fig. 6 position. Upon the shaft 63 is an arm 67, which carries a pin 68 engaging a slot 69 in the lever 66, so that the lever 66 may have a greater throw from the Fig. 4 to the Fig. 6 position, than is given to the arm 67 and shaft 63; whereby the rocking of said shaft 63 may be effected, as aforesaid, by the cam disk 54, without swinging lever 66 and the double-acting spring 65 too near the dead-center position.

At Fig. 6, it will be seen that the springs 53 are effective to hold the arms 43 down, and hence bring the racks 41 into mesh and the racks 28 out of mesh with the computing pinions 29; while the springs 48 press idly or neutrally toward the pivots 44. Thus the position of the shifting handle 66 controls the positions of all the opposing racks 28 and 41, and thus determines the setting of these devices for either addition or subtraction. It is not necessary in all cases to employ the automatic devices 54, 58, 60, etc., as in some cases the racks 28 or 41 may be dragged back over the teeth of the stationary pinions 29, their ratchet shape permitting such movement.

The tens-carrying trains include teeth 70 upon the dial wheels 30, for starting or initiating the movements of pinions 71, which are loosely mounted upon a shaft 72, each pinion being rigidly connected to a three-toothed wheel 73, which is adapted at each tens-carrying operation to revolve into mesh with a gear 74 fixed upon the computing wheel 30 of next higher denomination to give the same one-tenth of a revolution. Said starting tooth 70 imparts to the nine-toothed pinion 71 only one-ninth of a revolution; the remaining two-ninths of the revolution necessary to complete the movement of the tens-carrying train being imparted thereto by said square shaft 55, which is power-driven, being for this purpose connected to said general operator 32, to be stationary during the advance stroke of said general operator, while the dial wheels are rotated, and to rotate during the return stroke of said general operator after the racks 28 or 41 have ceased to affect the dial wheels.

In performing addition, the shaft 55 and other parts turn in the direction of the arrows at Fig. 26. At said figure, it will be understood that the dial wheel 30 shows "9" at the sight hole, Fig. 9. In advancing from "9" to "0", the starting tooth 70 advances from the full line to the dotted line position at Fig. 26, during such movement engaging one of the teeth of the pinion 71 and rotating the same one ninth of a revolution, and then moving to the dotted line position clear of said pinion; the pinion being retained by the usual detent 75, Fig. 1, which is usually connected by a spring 76 to the detent 40 of the dial wheel. This spring detent 75 first opposes and then assists the starting tooth 70 in turning the pinion 71, and may bring the latter to position after it is disengaged from tooth 70. Three equidistant teeth 76 of the pinion 71 are cut away, so as to be unengageable by the segments or teeth 77 fixed upon said shaft 55, as at Fig. 26; although nine teeth on said pinion 71 are engageable by said detent 75. Each pinion has a peripheral groove 71ª, Fig. 11, to give clearance for rack 41 in the lowermost position of the latter. The movement of the pinion effected by the tooth 70 in moving from the full line to the dotted line position at Fig. 26 advances one of the six broad teeth of the pinion 71 into position to be engaged by the segment 77 upon the next movement of the shaft 55, as usual, and by this means, the pinion 71 is given two-ninths of a revolution, thus completing its tens-carrying movement of one-third of a revolution, and causing one of the teeth of wheel 73 to move into engagement with one of the teeth of wheel 74 of next higher denomination, and advance the latter one point or a tenth of a revolution together with its dial wheel 30. There is one of the segments 77 for each tens-carrying train; eight of said segments being illustrated. The movement of the shaft and segments is communicated from one of the racks 32 of the general operator by means of an idle pinion 78, Figs. 1 and 9, said pinions 78 meshing with a pinion 79, which rotates backwardly and forwardly at the reciprocation of the rack or general operator 32; and a clutch is employed for connecting the pinions 79 to the shaft 55, so that said shaft shall make a full revolution during the return stroke of the general operator 32. This clutch comprises a spring-pressed ball or roll 80, Fig. 3, occupying a recess 81 in a hub 82 loose on shaft 55, the end of which is shown as cylindrical, at Fig. 5; said spring pressing the ball into a recess 83 in the pinion 79, so that when said pinion moves to the right or clockwise at Fig. 3, it carries the hub 82 with it.

Said hub 82 which as previously stated is loose on shaft 55 is formed upon a bevel pinion 84, which forms part of a reversing gear, whereby the shaft 55 may be rotated in the opposite direction from that indicated by the arrow at Fig. 26, whenever it is necessary to perform subtraction. Said bevel pinion 84 meshes with an idle bevel pinion 85 journaled on a stud 86 carried by a fixed arm 87; and pinion 85 meshes with a bevel pinion 88 also loose upon the shaft 55. Pinions 84 and 88 revolve in opposite directions; and either one of them may be connected to the shaft 55 by means of a double clutch mechanism. The pinions 84 and 88 carry interior clutch members 89 and 90, and a double ended clutch member 91 is splined at 92 to the shaft 55, and is movable by a lever 93 (having a pin 94 to engage a peripheral groove 95 in the double clutch 91) into engagement with either clutch member 89 or 90. At Fig. 5 the pinion 84, whose hub 82 is clutched to driving pinion 79, as at Fig. 3, is shown connected to the clutch 91, and hence the shaft 55 must turn with said pinion 84, thus rotating the shaft 55 in the direction shown by the arrow at Fig. 26, to carry tens at the operation of addition.

When, however, the lever 93 is moved to carry the double clutch 91 away from pinion 89, and into mesh with pinion 90, the shaft 55 is rotated in the opposite direction, and this is done at the subtraction operation, in order to cause the trains 71, 73 to borrow tens.

At the subtraction operation, the wheels 30 move to the left or in the direction opposite to that shown by the arrow in Fig. 26; and assuming that the wheel shows "0" at the sight opening, the tooth 70 will be in the dotted line position at Fig. 26, and while the wheel moves from "0" to "9," said tooth will engage pinion 71, and rotate the same clock-wise or toward the right, so that one of the six broad teeth thereon will move into the path of a segment or tooth 96 fixed on the shaft 55, and said segment 96 will rotate toward the left or counter-clockwise, and drive the pinion 71 in the opposite direction from that shown by the arrow, so that one of the teeth on wheel 73 will engage the wheel 74 of next higher denomination, and move the same reversely or in subtraction direction for one tenth of a revolution, thus borrowing ten therefrom.

It will be seen that the first or unit segments 77 and 96 may conveniently be formed in one piece as at Fig. 18; and the remaining segments 77 and 96 may be disposed in joined pairs on opposite sides of the line joining the axes 72 and 55, and equally spaced therefrom.

The segments 77 are spirally disposed along the shaft 55, so that the tens-carrying trains may be operated *seriatim*, whereby one individual tens-carrying operation is completed before another one is made. The segments 96 are also disposed spirally for a similar purpose, the spiral extending however in the opposite direction, so that tens may be borrowed by one train before the next higher train is operated.

Each subtraction segment or spur may be conveniently formed of the same piece of sheet metal as the corresponding addition segment or spur, and in such case, the double segments will have the shapes illustrated in Figs. 18 to 24. The single segment 97, Fig. 25, may conveniently be made common to both addition and subtraction sets, as shown; this being the segment of highest denomination. It will be understood that the shaft 55 normally occupies such a position that a revolution in either direction will bring a corresponding set of segments into play, while the other set moves idly throughout the revolution. Whichever set of segments first comes into play will clear the pinions 71, so that they will not be affected by the movement of the other set of segments.

The shifting lever 93, for reversing the direction of rotation of the shaft 55, may be connected to the lever 66, for shifting the double clutch 91 at the same time that the spring-carrying bar is swung, so that when the lever 66 is pulled forward to the Fig. 9 position, the springs 48 are brought into use to carry the addition racks 28 up into mesh with the pinions 29, and at the same time the double-clutch member 91 is slid into engagement with the addition clutch member 89, as at Figs. 5 and 10. The connection includes an arm 98 fixed to a rock shaft 99 to which said lever 93 is attached, said arm connected by a link 100 to an arm 101 depending from the shift lever 66. This link 100 has at its forward end a slot 102 to engage a pin 103 on said arm 101, so that the latter may swing until the spring 65 is at the dead center, without affecting the link 100 or the clutch 91; and a spring detent 104, having a tooth 105 to engage either of two notches 106 on a plate 107 fixed to rock shaft 99, holds the clutch against displacement during movements of the arm 101 and bar 49 effected by the cam disk 54, so that the shaft 55 will not become unclutched while the racks 28 and 41 are moved to their intermediate disengaged positions during their return strokes. It will be understood that the parts will also move automatically (during the return stroke of the general operator) to the Fig. 7 position from the Fig. 6 position, as well as from the Fig. 8 position.

The dial wheels 30 may be all returned to zero in the usual manner when the machine is set for addition, that is whenever the handle 66 is in its forward position. The dial wheels 30 are loosely mounted on an arbor 108 in which are formed depressions 109 to receive balls 110 and compression springs 111. These balls are pressed outwardly into notches 112 formed in the hubs of the dial wheels 30, so that whenever said arbor is revolved in one direction it will carry all the wheels, with a view of bringing them to zero position. The first or units recess of the arbor is set in advance of the others, so that the units wheel is brought to "0" when all the other wheels are brought to "9." Thereafter the advance of the wheels above the units wheel is effected by the tens-carrying mechanism. Upon said arbor 108 is fixed a disk 112, having a recess 113, into which snaps a detent 114, to hold the arbor in normal rotative position; said detent being of sufficient width to permit endwise displacement of the arbor and disk, for a purpose presently to be explained.

The arbor 108 is rotated by means of a pinion 114, which meshes with a driving rack 115, the latter being controlled by the zero key and operated by the general operator in the usual manner, as set forth in said Hart application. In said pinion is a notch 116, into which projects a ball 117 which is seated in a recess 118 in said arbor 108 and is pressed into said notch by a spring 119. Whenever the zero key is depressed and the general operator is operated, said rack is driven forwardly and then backwardly. During the forward stroke it rotates the arbor 108 and brings the units wheel to "0" and the remaining wheels to "9." The return stroke of said driving rack and pinion is idle.

In order to release all the dial wheels from the control of said zero-setting device when subtraction is to be performed, there is provided upon the arbor 108 an extension 120, having at its end a boss 121, Fig. 4, having a peripheral groove engaged by a pin 122 formed upon an arm 123 extending forwardly from lever 93. Whenever the finger-piece 66 is shifted to set the machine for subtraction, the arm 123 is rocked to move the arbor 108 to the left, to prevent it from checking the movements of the computing wheels 30 in subtraction direction, each wheel 30 having for this purpose an inclined slot 129, (Fig. 17) said slot extending in a direction nearly lengthwise or diagonally of said arbor 108, and the wall thereof being adapted to force the balls 110 to sink into the recess in said arbor. Endwise displacement of the arbor continues until the balls come within the smooth or uncut bores 130 in the hubs of the wheels 30, so that said balls 110 cannot offer obstructions to the rotation of said wheels in subtraction direction. It will be seen that when the machine is set for subtraction, the wheels cannot be set to zero by said zero mechanism; but that when the machine is set for addition, the zero mechanism becomes potent or effective.

At the endwise displacement of arbor 108, a collar 131 thereon carries the pinion 114$^a$ with it, and a flange 132 on the pinion may be employed to carry the forward end of the rack 115 idly sidewise; the rack being confined laterally between 132 and 114$^a$, and suitably supported on a rest 133 for this sidewise sliding movement.

Variations may be resorted to within the scope of the invention, and portions of the improvements may be used without others.

Having thus described my invention, I claim:

1. The combination with computing pinions, of bars carrying opposed racks, and yielding arms shiftable to hold either set of racks in mesh with the pinions, said bars having slots and said arms having means to engage said slots to shift the bars.

2. The combination with computing pinions, of bars carrying opposed racks, arms shiftable to hold either set of racks in mesh with the pinions, said arms having cross-pieces formed thereon, and spring fingers to engage said cross-pieces, said spring fingers being shiftable to render them either effective or ineffective to move the arms and bars.

3. The combination with computing pinions, of bars carrying opposed racks, arms shiftable to hold either set of racks in mesh with the pinions, said arms having cross-pieces formed thereon, and two sets of spring fingers to engage said cross pieces, one set for moving the arms in one direction, and the other set for moving them in the opposite direction.

4. The combination with computing pinions, of bars carrying opposed racks, arms shiftable to hold either set of racks in mesh with the pinions, said arms having cross-pieces formed thereon, and spring fingers to engage said cross-pieces, said spring fingers being shiftable to render them either effective or ineffective to move the arms and bars and including two sets, one for moving the arms in one direction, and one for moving them in the opposite direction.

5. The combination with computing pinions, of bars carrying opposed racks, arms shiftable to hold either set of racks in mesh with the pinions, said arms having cross-pieces formed thereon, spring fingers to engage said cross-pieces, said spring fingers including two sets, one for moving the arms in one direction, and one for moving them in the opposite direction, and means for moving either set to effective position and the other set to ineffective position.

6. The combination with computing pinions, of bars carrying opposed racks, arms shiftable to hold either set of racks in mesh with the pinions, said arms having cross-pieces formed thereon, spring fingers to engage said cross-pieces, said spring fingers including two sets, one for moving the arms in one direction, and one for moving them in the opposite direction, means for moving either set to effective position and the other set to ineffective position, and means for automatically moving the spring fingers to equalizing positions to withdraw the racks entirely from the pinions during a return stroke of the general operator.

7. The combination with computing pinions, of bars carrying opposed racks, arms shiftable to hold either set of racks in mesh with the pinions, said arms having cross-pieces formed thereon, spring fingers to engage said cross-pieces, said spring fingers including two sets, one for moving the arms in one direction, and one for moving them in the opposite direction, means for moving either set to effective position and the other set to ineffective position, a finger-piece for shifting said spring fingers, and a double-acting spring connected to said finger-piece to hold it in either addition or subtraction position.

8. The combination with computing pinions, of bars carrying opposed racks, arms shiftable to hold either set of racks in mesh with the pinions, said arms having cross-pieces formed thereon, spring fingers to engage said cross-pieces, said spring fingers including two sets, one for moving the arms in one direction, and one for moving them in the opposite direction, means for moving either set to effective position and the other set to ineffective position, a finger-piece for shifting said spring fingers having a loose connection therewith, and a double-acting spring connected to said finger-piece to hold it in either addition or subtraction position.

9. The combination with a system of computing pinions, of addition and subtraction racks or operators shiftable into and out of engagement with said pinions, pivoted arms to engage said racks for shifting them, cross-pieces on said arms, addition and subtraction springs to engage said cross-pieces, a shiftable rocking bar on which said springs are carried, a cross-piece connected to said shiftable rocking bar, an arm to engage the last named cross-piece to shift said bar and springs to neutral positions, and an arm-operating cam connected to operate during the return or idle strokes of the racks.

10. The combination with a system of computing pinions, of addition and subtraction racks or operators shiftable into and out of engagement with said pinions, pivoted arms to engage said racks for shifting them, cross-pieces on said arms, addition and subtraction springs to engage said cross-pieces, a shiftable rocking bar on which said springs are carried, a cross piece connected to said shiftable rocking bar, an arm to engage the last named cross-piece to shift said bar and springs to neutral positions, a shaft which revolves during the return idle strokes of the rack, a cam on said shaft, and means to enable said cam to control said arm to release said racks from the pinions during their return strokes.

11. The combination with a system of computing pinions, of addition and subtraction racks or operators shiftable into and out of engagement with said pinions, pivoted arms to engage said racks for shifting them, cross-pieces on said arms, addition and subtraction springs to engage said cross pieces, a shiftable rocking bar on which said springs are carried, a cross-piece connected to said shiftable rocking bar, an arm to engage the last named cross-piece to shift said bar and springs to neutral positions, an arm-operating cam connected to operate during the return or idle strokes of the racks, said bar being shiftable to bring either addition or subtraction springs into use to neutralize the other set of springs, and a finger-piece for shifting said bar.

12. The combination with a system of computing pinions, of addition and subtraction racks or operators shiftable into and out of engagement with said pinions, pivoted arms to engage said racks for shifting them, cross-pieces on said arms, addition and subtraction springs to engage said cross-pieces, a shiftable rocking bar on which said springs are carried, a cross-piece connected to said shiftable rocking bar, an arm to engage the last-named cross-piece to shift said bar and springs to neutral positions, an arm-operating cam connected to operate during the return or idle strokes of the racks, said bar being shiftable to bring either addition or subtraction springs into use to neutralize the other set of springs, a finger-piece for shifting said bar, said finger-piece having a loose connection with said bar, and a double-acting spring connected to said finger piece to hold it in either position to which it is shifted.

13. The combination with computing wheels, of a reciprocating general operator, shiftable means to enable said general operator to rotate said wheels in opposite directions; said wheels having starting teeth, tens-carrying trains started in either direction by said teeth, and a driver operable by said general operator during the return stroke of the latter and having means for completing the movements of said trains in either direction.

14. The combination with computing wheels, of a reciprocating general operator, shiftable means to enable said general operator to rotate said wheels in opposite directions; said wheels having starting teeth, tens-carrying trains started in either direction by said teeth, a driver operable by said general operator during the return stroke of the latter and having means for completing the movements of said trains in either direction, and shiftable means for causing said driver to revolve in either direction during the return stroke of the general operator.

15. The combination with computing wheels, of a reciprocating general operator, shiftable means to enable said general operator to rotate said wheels in opposite directions; said wheels having starting teeth, tens-carrying trains started in either direction by said teeth, and a driver operable by said general operator during the return stroke of the latter and having means for completing the movements of said trains in either direction, said driver having two sets of operating devices for said tens-carrying trains and movable by said general operator in either direction from normal position to bring either of said sets into use.

16. The combination with computing wheels, of a reciprocating general operator, shiftable means to enable said general operator to rotate said wheels in opposite directions; said wheels having starting teeth, tens-carrying trains started in either direction by said teeth, and a driver operable by said general operator during the return stroke of the latter and having means for completing the movements of said trains in either direction, said driver having two sets of operating devices for said tens-carrying trains, and movable by said general operator in either direction from normal position to bring either of said sets into use, the devices in either of said sets coöperating with said trains to clear the latter so that they will not be affected by the other of said sets during the final portion of the movement of said power-driven driver.

17. The combination of a set of computing wheels, a general operator, shiftable means for enabling said general operator during its movement in one direction to rotate said wheels either forwardly or backwardly, tens-carrying trains for said wheels, means to enable said wheels to start said tens-carrying trains either forwardly or backwardly, a driver for said trains, and shiftable means to enable said general operator to rotate said driver in either of two opposite directions.

18. The combination of a set of computing wheels, key-set pins or devices to determine the extent of rotation thereof, a general operator for said wheels, shiftable means to enable said general operator in its forward stroke to rotate said wheels either forwardly or backwardly, tens-carrying trains for said wheels, means to enable said wheels to start said tens-carrying trains either forwardly or backwardly, a driver for said trains, and shiftable means to enable said general operator upon its return stroke to rotate said driver in either of two opposite directions.

19. The combination with computing wheels rotatable in opposite directions, and having starting teeth, of tens-carrying trains started in either direction by said teeth, a power-driven driver for completing the movement of said trains either forwardly or backwardly, means to control the direction of movement of said computing wheels and of said power-driven driver, and a finger-piece connected to said controlling means for operating the same.

20. The combination, with a system of computing wheels, of driving means therefor for rotating said wheels alternatively in one direction or the other to perform either addition or subtraction, said driving means being shiftable with relation to said wheels; a mechanism independently of said driving means for returning said wheels to zero; setting mechanism for controlling the shifting of said driving means; and means for rendering said zero mechanism inoperative when said setting mechanism has been actuated to set said driving means for subtraction.

21. The combination with a system of computing wheels, of shiftable means for rotating them in opposite directions, to perform either addition or subtraction, a mechanism for returning said wheels to zero, including an arbor on which said wheels are mounted and individual clutches between said arbor and said wheels, and means for silencing said clutches when the machine is set for subtraction.

22. The combination with a system of computing wheels, of shiftable means for rotating them in opposite directions, to perform either addition or subtraction, a mechanism for returning said wheels to zero, including an arbor on which said wheels are mounted and individual clutches between said arbor and said wheels, and means for moving said arbor endwise to disengage the clutches.

23. The combination with a system of computing wheels, of shiftable means for rotating them in opposite directions, to perform either addition or subtraction, a mechanism for returning said wheels to zero, including an arbor on which said wheels are mounted and having holes therein and individual clutches between said arbor and said wheels, and means for moving said arbor endwise to disengage the clutches, said clutches comprising clutching balls and springs, and said wheels having inclines effective at the endwise movement of said arbor for camming the balls into the holes in the arbor, to permit the wheels to rotate in subtraction direction independently of the balls.

24. The combination with a system of computing wheels, of shiftable means for rotating them in opposite directions, to perform either addition or subtraction, a mechanism for returning said wheels to zero, including an arbor on which said wheels are mounted having holes therein and individual clutches between said arbor and said wheels, means for moving said arbor endwise to disengage the clutches, said clutches comprising clutching balls and springs, and said wheels having inclines effective at the endwise movement of said arbor for camming the balls into the holes in the arbor, to permit the wheels to rotate in subtraction direction independently of the balls, a general operator, shiftable racks operable by said general operator for turning the wheels either forwardly or backwardly, a lever for shifting said racks, and means controlled by said lever for shifting said arbor endwise, to render the clutches ineffective at the subtraction operation.

25. The combination of a set of computing wheels, key-set pins or devices, a general operator to coöperate with said key-set pins to rotate said wheels to various extents determined by said pins, a finger-piece, shiftable means connected to said finger-piece for enabling said general operator, in its forward stroke, to rotate said wheels either forwardly or backwardly, tens-carrying trains for said wheels, means to enable said wheels to start said tens-carrying trains either forwardly or backwardly, a driver for said trains, and shiftable means also connected to said finger-piece to enable said general operator, upon its return stroke, to rotate said driver either forwardly or backwardly.

26. The combination of a set of computing wheels, key-set pins or devices, a general operator to coöperate with said key-set pins to rotate said wheels to various extents determined by said pins, a finger-piece, shiftable means connected to said finger-piece for enabling said general operator, in its forward stroke, to rotate said wheels either forwardly or backwardly, tens-carrying trains for said wheels, means to enable said wheels to start said tens-carrying trains either forwardly or backwardly, a driver for said trains, shiftable means also connected to said finger-piece to enable said general operator, upon its return stroke, to rotate said driver either forwardly or backwardly, and mechanism for returning the wheels to zero, including a shiftable member and means connected to said finger-piece to render said shiftable member ineffective when the machine is set for subtraction.

27. The combination with a system of computing wheels, of rack bars for rotating said computing wheels, said rack bars having an intermediate position and two extreme positions determining three different states of said rack bars, and spring means for yieldingly determining the positions of said rack bars.

28. The combination with a system of computing wheels, of a carry-over mechanism for said computing wheels, said carry-over mechanism including a plurality of segments common to each computing wheel and lying in the same plane.

29. The combination with a system of computing wheels, of a carry-over mechanism for said computing wheels, said carry-over mechanism including for each computing wheel a pair of assisting segments lying in the same plane so that the first segment approaching said computing wheel may enable the carry-over action.

30. The combination with a system of computing wheels, of a series of rack bars for rotating said computing wheels, said rack bars being shiftable to effective and ineffective positions, and locking means for securing said rack bars in either their effective or ineffective position.

31. The combination with a system of computing wheels, of rack bars for rotating said computing wheels, said rack bars having two different effective positions corresponding to the rotation of said computing wheels in opposite directions, and locking means for maintaining said rack bars in either of their effective positions.

32. The combination with a system of computing wheels, of a set of rack bars for actuating said computing wheels so as to run up numbers thereon, said rack bars having two different effective positions corresponding to the rotation of said computing wheels in opposite directions and also having a neutral position in which they are effective, locking means for securing said rack bars in either of their effective positions, and retaining means for maintaining said rack bars in their neutral position.

33. The combination with a system of computing wheels, of a series of rack bars for rotating said computing wheels either forwardly or backwardly during the movement of said racks in one direction, a rotary carry-over mechanism extending from wheel to wheel for positively driving the next higher computing wheel through a fraction of a revolution when the next lower computing wheel has been rotated through a complete cycle in either direction, means for rotating said carry-over mechanism, during the movement of said racks in the other direction, and means for reversing the direction of rotation of said carry-over mechanism.

34. An assisting gear comprising a shaft with a series of segment arms secured on said shaft and formed in integral pairs, the arms of each pair being arranged in a spiral series with the corresponding arms of the other pairs, the spiral formed by one set of arms coiling in one direction and the spiral formed by the other set of arms coiling in the opposite direction.

35. The combination with a system of computing wheels, of a set of rack bars for engaging said computing wheels in different manners to rotate the same in opposite directions, a carry-over mechanism for said computing wheels, a clutch for varying the direction of rotation of said carry-over mechanism, and shifting means for concomitantly adjusting the position of said clutch and the position of said rack bars.

36. The combination with a system of computing wheels, of a set of rack bars for engaging said computing wheels in a plurality of manners to vary the character of rotation of said computing wheels, a carry-over mechanism for said computing wheels, a reversible gearing for determining the direction of rotation of said carry-over mechanism, a zero mechanism for returning said wheels to zero, and adjusting means for concomitantly determining the position of said rack bars, the direction of drive of said carry-over mechanism through said reversible gearing, and the effectiveness of said zero mechanism.

37. The combination with a system of computing wheels, of rack bars arranged to rotate said computing wheels in opposite directions by engaging said computing wheels in different manners, a zero mechanism for returning said computing wheels to zero, and an adjusting means for concomitantly varying the character of engagement of said racks with said computing wheels and rendering said zero mechanism ineffective.

38. The combination with a series of computing wheels, of a series of racks for driving said computing wheels either in one direction or the other for addition or subtraction, said racks having an advancing and a returning movement for the operation of running up a computation, and a tens-carrying mechanism for effecting carry-over operations between computing wheels, said tens-carrying mechanism being actuated solely during the return stroke of said racks whether said racks are rotating said computing wheels in one direction or the other for addition or subtraction.

39. The combination with a series of computing wheels, of a series of racks for driving said computing wheels either in one direction or the other for addition or subtraction, said racks having an advancing and a returning movement for each running up of a computation on said computing wheels, the actual rotation of said computing wheels by said racks whether in one direction or the other, taking place always in the advancing movement of said racks, and a tens-carrying mechanism for effecting a carry-over operation between said computing wheels, said tens-carrying mechanism acting always on the return stroke of said racks whether said computing wheels are rotated for addition or subtraction.

40. The combination with a system of computing wheels, of a series of rack bars for rotating said computing wheels, said rack bars having an intermediate neutral position and two extreme active positions, one for performing addition on said wheels and the other for performing subtraction thereon, a general operator for advancing said rack bars and returning said rack bars, said rack bars being always in one of their active positions during such advancing movement thereof, so as to alternatively perform addition or subtraction at such time, and means acting concomitantly with said general operator for shifting said rack bars to an intermediate neutral position during the return stroke of said rack bars.

41. The combination with a series of computing wheels, of a series of rack bars, one individual to each of said computing wheels, said rack bars being arranged to rotate said computing wheels in one direction or the other, to alternatively perform addition or subtraction, and always by an advancing movement of said rack bars, and means for automatically moving said rack bars to a position incapable of affecting said computing wheels during a returning movement of said rack bars.

42. The combination with a series of computing wheels, of a series of bars for rotating said computing wheels, said bars being arranged to rotate said computing wheels in one direction or the other by a movement of said bars always in the same direction and at the same period of one complete operation, and means for automatically shifting said bars to a neutral or inactive position at the end of such period.

43. The combination with a series of computing wheels, of racks for rotating said computing wheels, shifting means for said racks, a pair of springs for operating said shifting means in one direction or the other according to which of said springs is active, and means for adjusting said springs bodily to determine the activity of one or the other of said springs.

44. The combination with a series of computing wheels, of a series of racks for driving said computing wheels, and a plurality of springs for shifting said racks to determine the drive of said computing wheels thereby, said springs acting by one or the other moving to a neutral position where the spring in such a position effects no tendency to shift said racks.

45. The combination with a series of computing wheels, of a series of racks for rotating said computing wheels, shifting means for adjusting said racks with respect to said computing wheels to determine the drive of said computing wheels by said racks, and a pair of springs arranged to operate on either side of the dead center of said shifting means so as to be alternatively effective to operate said shifting means and thus adjust said racks.

46. The combination with a series of computing wheels, of a series of racks for rotating said computing wheels, shifting means for adjusting said racks with respect to said computing wheels to determine the drive of said computing wheels by said racks, and a pair of springs arranged to operate on either side of the dead center of said shifting means so as to be alternatively effective to operate said shifting means and thus adjust said racks, said springs acting by having a variable leverage with respect to each other and with respect to said dead center.

47. The combination with a series of computing wheels, of a series of racks for rotating said computing wheels, shifting means for adjusting said racks with respect to said computing wheels to determine the drive of said computing wheels by said racks, a pair of springs arranged to operate on either side of the dead center of said shifting means so as to be alternatively effective to operate said shifting means and thus adjust said racks, and means opposing the action of both said springs to prevent the drive of said computing wheels by said racks.

48. The combination with a series of computing wheels, of a plurality of racks for driving said computing wheels, said racks being arranged to rotate said computing wheels in opposite directions, a carry-over mechanism for carrying between adjacent computing wheels, driving gearing changeable to vary the direction of rotation of said carry-over mechanism, and shifting means for concomitantly varying the direction of drive of said carry-over mechanism by said gearing and the position of said racks in driving said computing wheels.

49. The combination with a plurality of computing wheels, of a series of rack bars for driving said computing wheels, said rack bars having a series of pins settable thereon to determine the extent of movement thereof, means for moving said rack bars vertically to enable the setting of pins thereon, means for moving said rack bars vertically to determine the engagement and disengagement of said rack bars to drive said computing wheels, and means for moving said rack bars horizontally to rotate said computing wheels.

50. The combination with a series of computing wheels, of a series of gears, one individual to each of said computing wheels, a series of rack bars having racks to engage said gears to drive said computing wheels, each of said rack bars having a plurality of pins settable thereon to determine the extent of movement thereof, means for moving said rack bars in a direction transverse to the direction of length thereof, so as to enable the setting of the pins thereon, and means for moving said rack bars in a direction transverse to the direction of length thereof for determining the engagement and disengagement of said racks and said gears.

51. The combination with a series of computing wheels, of a gear connected to said computing wheel, a bar having a hook portion embracing said gear, with a rack surface extending on both sides of said hook portion so as to engage said gear on one side or the other of its center, and means for actuating said bar.

52. The combination with a system of computing pinions; of driving racks therefor rockable into and out of mesh with said pinions; and resilient means for normally holding said racks in mesh with said pinions, said resilient means shifting automatically consequent upon a driving movement of said racks, and acting consequent upon such shifting to rock said racks out of mesh with said pinions.

53. The combination with a system of computing pinions; of driving racks therefor rockable into and out of mesh with said pinions; and resilient means for holding said racks in mesh with said pinions during their driving movements; said resilient means shifting automatically, when said racks commence their return movement and acting consequent upon such shifting, to rock the racks out of mesh with said pinions.

54. The combination, with a system of computing pinions; of driving racks therefor rockable into and out of mesh with said pinions; shiftable means engaged with said racks to determine their position with relation to said pinions; yielding controlling means associated with said shiftable means to hold said racks in mesh with said pinions during the driving movement; said means operating automatically, when said racks commence their return movement, to shift said controlling means and cause the same to action said shiftable means to unmesh said racks from said pinions.

55. The combination, with a system of computing pinions; of driving racks therefor carrying opposed racks to actuate said pinions alternatively in one direction or the other during the advance movement of the racks, thereby to cause either addition or subtraction to be performed; and resilient means for holding one set of racks in mesh with said pinions during such movement, said resilient means shifting automatically, when said racks commence their return movement, to rock said drivers with relation to said pinions and unmesh said set of racks therefrom.

56. The combination, with a system of computing wheels; of rack bars for rotating said wheels; means for shifting said bars to effect their engagement with said wheels; a plurality of springs for determining the position of said shifting means; and means for adjusting the position of said springs relatively to said shifting means, to determine their effectiveness thereupon.

57. The combination, with a system of computing wheels; of rack bars for rotating said wheels; means for shifting said bars to effect their engagement with said wheels; a plurality of springs operative directly upon said shifting means, to determine the position thereof; a movable carrier for said springs; and means for shifting said carrier, to adjust the position of said springs relatively to said shifting means and determine their effectiveness thereupon.

58. The combination, with a system of computing wheels, and driving pinions associated therewith, of rack bars for driving said pinions, each bar having a pair of opposed addition and subtraction racks between which the corresponding pinion is disposed; means for shifting said bars to engage the racks thereon alternatively with said pinions; a plurality of springs for determining the position of said shifting means; and means for adjusting the position of said springs relatively to said shifting means, to determine their effectiveness thereupon.

59. The combination, with a system of computing wheels, and driving pinions associated therewith; of rack bars for driving said pinions, each bar having a pair of opposed addition and subtraction racks between which the corresponding pinion is disposed; means for shifting said bars to engage the racks thereon alternatively with said pinions; a plurality of springs operative directly upon said shifting means, to determine the position thereof; a movable carrier for said springs; and means for shifting said carrier, to adjust the position of said springs relatively to said shifting means and determine their effectiveness thereupon.

60. The combination, with a system of computing wheels; of mechanism for alternatively driving said computing wheels in one direction or the other to cause them to alternatively perform addition or subtraction; a rotatable carry-over mechanism for said computing wheels; driving means therefor including a clutch to reverse the direction of drive; zero-setting mechanism for said computing wheels; and adjusting means for concomitantly determining the position of said clutch and the effectiveness of said zero-setting mechanism.

61. The combination, with a totalizer; of a carry-over mechanism for said totalizer, said carry-over mechanism including an assisting shaft; an operator for driving said assisting shaft, said operator being movable in one direction only to effect such drive; and a reversing gearing on said shaft for driving said shaft in one direction or the other during the driving movement of said operator, according to the character of computation being carried on by said totalizer.

62. In a computing machine, the combination, with computing wheels and carry-over devices therefor for either adding or subtracting; of a shaft provided with a set of spirally-arranged driving members for said carry-over devices; a second set of spirally-arranged driving members on said shaft disposed oppositely with respect to the first-named set and located in the same plane therewith; and means for driving said shaft in either direction.

BURNHAM C. STICKNEY.

Witnesses:
K. FRANKFORT,
LORENZ L. PRITZL.